June 27, 1967 J. C. BLOOM ETAL 3,328,041
SLIPPER AND LOADING ELEMENT FLUID SEAL
Filed Jan. 22, 1964 2 Sheets-Sheet 1
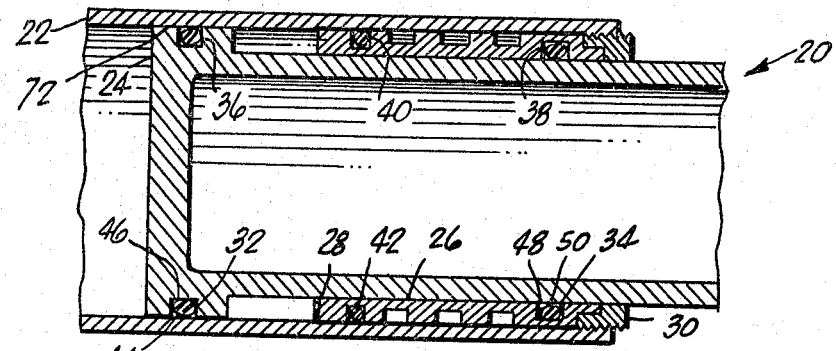
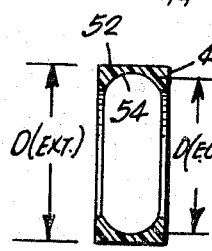
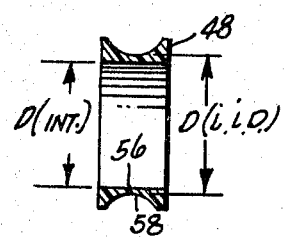
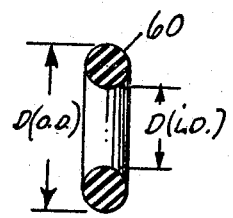
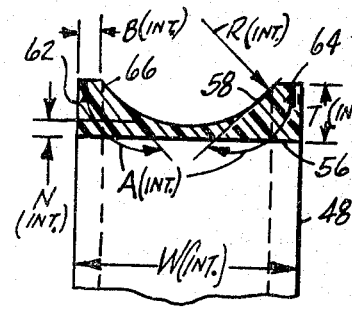
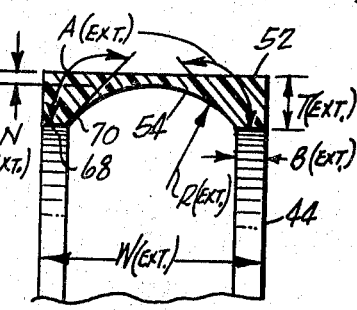
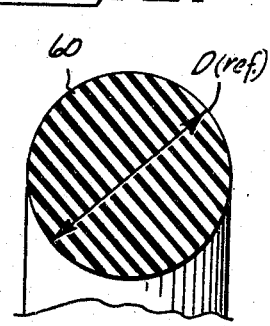
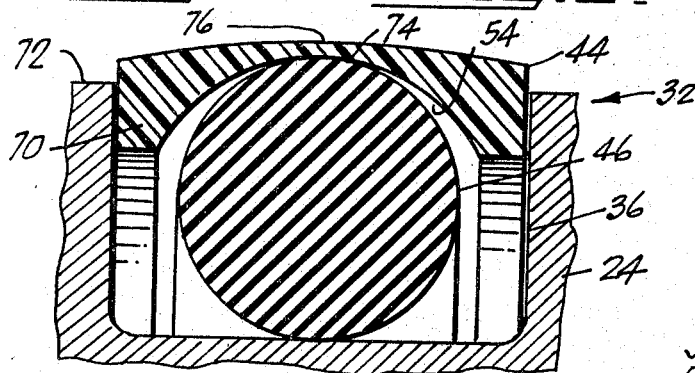
INVENTORS
JOHN C. BLOOM
JAMES V. WALKER
ERNEST P. WALTHER, DECEASED
BY JEANETTE D. WALTHER, WIDOW
BY Dock N. Jen
AGENT

United States Patent Office 3,328,041
Patented June 27, 1967

3,328,041
SLIPPER AND LOADING ELEMENT FLUID SEAL
John C. Bloom, Inglewood, and James V. Walker, Redondo Beach, Calif., and Ernest P. Walther, deceased, late of Fullerton, Calif., by Jeanette D. Walther, widow, Fullerton, Calif., assignors to Douglas Aircraft Company, Inc., Santa Monica, Calif.
Filed Jan. 22, 1964, Ser. No. 339,559
12 Claims. (Cl. 277—165)

This invention relates generally to hydraulic seals and more particularly to an improved fluid seal for precluding leakage of hydraulic fluid, working under pressure, from leaking between two relatively moving members such as a piston and its mating cylinder.

Hydraulic seals are commonly used in hydraulic power cylinders, valve assemblies, swivel mechanisms and the like to prevent leakage of the working fluid between two relatively moving components having motions which normally involve either reciprocatory (translational) movements or oscillatory (rotational) movements. Many of these devices, of both types of movements, are operated almost continuously either rapidly or slowly while others are only operated intermittently either slowly or rapidly for a short period of time between comparatively long time intervals in which they are at rest. The seals in the strenuously or continuously operated devices are, of course, subject to extreme wear and early failure. However, the seals in the devices which are operated only briefly after prolonged periods of inactivity usually require a high breakout force that could easily reduce the sealing effectiveness of such seals. Thus, both the seals in the frequently and occasionally operated categories of devices have been found to be lacking in durability and reliability.

It is essential, for example, in the large, passenger transport aircraft which employ various types of hydraulic power-operated devices, that certain of these mechanisms be highly reliable and have long life. It is evident, of course, that the critical landing gear power cylinders should be entirely reliable and effective even though they may be only operated during the relatively short take-off and landing phases of a long flight. Similarly, there are various continuously or frequently operated hydraulic actuators or control mechanisms that are critical to the safe and proper operation of large aircraft. Thus, it is extremely important that the hydraulic seals used in all of the critical mechanisms in aircraft be very dependable and effective under all conditions of operation.

Seals utilizing a cap ring or boot made of a material having a nonvariable and low coefficient of friction, such as Teflon, in conjunction with a conventional O-ring loading and auxiliary sealing element were found to provide improved endurance performance over seals comprising only an O-ring or other types of cross sectional configuration of packing elements. Such a two-element seal is disclosed in U.S. Patent No. Re. 24,440 of William Groen, granted Mar. 4, 1958, for Hydraulic Seal. The use of Teflon cap ring in combination with a suitable loading element results in appreciably lower friction sealing between two reatively moving members. This has the advantage of increasing the life of the seal and reducing the breakout friction appearing in seals which have remained on stand-by duty for an extended period of time.

Another type of two-element seal which includes the use of a low-friction cap ring or boot is disclosed in U.S. Patent No. 2,968,501 of Richard E. Tisch, granted Jan. 17, 1961, for Fluid Seal. This patent described the wear and ultimate failure of an O-ring loading element due to use of prior art types of cap rings or boots. It also showed that excessive scrubbing at the sealing point of an O-ring loading element still remained even though a modified cross sectional configuration of cap ring or boot was used. The provision of a triangularly shaped, cross sectional loading element in combination with the modified cross sectional configuration of cap ring or boot produced the Tisch fluid seal which was claimed to reduce much of the above-noted faults.

Still other types of seals were subsequently developed to improve the performance and reliability of hydraulic seals which were used in critical mechanisms in, for example, large passenger carrying aircraft. The patent application Ser. No. 68,959 of Charles W. Galloway, filed Nov. 14, 1960, for Hydraulic Cap and Pressure Ring Seal, now Patent No. 3,149,848 issued Sept. 22, 1964, disclosed a seal including a rectilinear, rectangularly shaped, cross sectional loading element which provided more uniform and effective loading force to its cap ring or boot. The cap ring or boot included a rectilinearly matching concavity which solidly engaged the outer end of the loading element. The greater cross sectional area of the loading element, when compressed, filled the groove in which it was installed and greatly reduced the movements of the loading element in its groove to eliminate virtually all scrubbing of the element. At the same time, the wider loading element produces the more uniform loading force over a much greater portion of the cap ring such that better sealing was claimed to be obtained from very low to very high working fluid pressures, under various operating conditions and requirements.

Installation problems, however, have been almost universally encountered in the prior art seals. For certain sizes of seals, it was necessary, for example, that the groove in which the seal was to be installed, be split to permit installation. In closed grooves, there have been instances in which the installer was forced to freeze the member mounting compressed seals before it was possible to assemble the contracted member into its mating member without damaging the seals. The invention disclosed in patent application Ser. No. 121,142 of Billie R. Baldridge, filed June 30, 1961, for Cruciform Rubber Support Ring for Plastic Cap Rings, now Patent No. 3,149,849 issued Sept. 22, 1964, was developed to obviate such installation problems, and included a loading element which is generally cruciform in cross section having four annular, corner voids or reliefs to facilitate installation of its associated cap ring therewith in a groove.

Installation problems still exist, however, with all of the prior art, two-element seals. The process of installing such seals especially in closed grooves of integral (unsplit) gland structure is extremely difficult and the likelihood of seal damage during the installation operation is very great. These seals are often installation imperfectly and such defects cannot be easily observed or immediately discovered. The net result is that leakage increases and soon seal breakdown occurs. Thus, the life, performance and reliability of the installed prior art, two-element seals have been very poor, causing a continued effort in finding the long-sought solution to the problem. An attempt has been made to solve the installation problem partially by use of special grooves, but this has not been very satisfactory or adequate since it is highly desirable and quite often mandatory that standard configuration closed grooves such as in accordance to military specification MIL-P-5514 be used.

Bearing in mind the foregoing, it is a major object of this invention to provide an improved hydraulic seal which has a long life, and exceptionally good and reliable performance under all conditions of operation.

Another object of the invention is to provide an improved hydraulic seal which can be easily installed in various kinds of mechanisms having integral (unsplit) grooves from very small to very large standard sizes.

A further object of this invention is to provide an improved hydraulic sea having a cross sectional shape which produces very little wear and damage to its elements under strenuous use and all conditions of operation.

A still further object of the invention is to provide a two-element hydraulic seal wherein the elements are self-positioning such that proper alignment of elements are easily obtained during installation to produce a satisfactory seal.

Briefly, and in general terms, the foregoing and other objects are preferably accomplished by providing an improved fluid seal comprising the combination of an annular cap ring or slipper having a novel cross sectional shape or configuration, and a conventional or standard O-ring loading element which engages a fully curved portion of the cross sectional shape of the slipper.

The slipper is an annular ring preferably fabricated from a material having a low coefficient of friction, such as Teflon. It has a sealing surface which is cylindric for bearing and moving against the cylindrical surface of a relatively moving cylinder or rod. The slipper is positioned in the usual annular, generally rectangular cross sectional groove in the peripheral surface of a piston or bearing gland so that the cylindric sealing surface bears against the associated surface of the associated, relatively moving cylinder or rod.

The slipper has a fully curved, inner concave surface, and the O-ring is positioned between this concave surface and the base or bottom of the groove. In the relaxed state, the inner concave surface of the slipper is circular in a preferred embodiment of this invention, and is symmetrically arranged with respect to the cylindric sealing surface to form two similar flanges at respective ends of the slipper. These flanges extend toward the base of the groove, and define a width or axial length of the slipper which is substantially equal to the width or axial length of the groove.

The slipper is thus maintained aligned by the groove, and since the O-ring also has a circular cross section, it tends to align itself with the inner, circular concave surface of the slipper during seal installation and afterwards when the O-ring is in a compressed state. While working under fluid pressure, the compressed O-ring tends to roll and slide along the smooth, fully curved, circular concave surface with increasing fluid pressure so that scrubbing on the high frictional base surface of the groove is minimized. The radius of the circular concave surface of the slipper relative to the radius of the normally circular O-ring cross section is dimensioned such that movement along the concave surface is generally encouraged.

At the same time, the edges of the circular concave surface make very obtuse angles with flange end surfaces which are parallel to the cylindric (outer) sealing surface of the slipper. Sharp angles which could cut into the pressurally moved O-ring are thus avoided. The dimensions of the cross sectional shape of the slipper are specifically defined in terms of the diameter of the relaxed, circular cross section of the O-ring to ensure a seal which can be easily installed and provide good and reliable performance.

The standard O-ring loading element is preferably a commercially available unit as shown by the military specification MIL-P-5514. Selection of any such O-ring for a two-element seal used with any particular cylinder or rod will establish the standard size groove therefor from the specification. Thus, the relaxed, circular cross sectional diameter of the O-ring can be used as a reference dimension in defining the dimensions of its associated slipper. Certain empirical relationships were discovered and are used to define the invention as shown below.

This invention possesses other features and advantages, some of which, together with the foregoing, will be set forth in the following detailed description of two illustrative examples of the invention. The invention will be more fully understood by reading the description in conjunction with the attached drawings, in which:

FIGURE 1 is a fragmentary, central sectional view of a hydraulic cylinder including a piston and cylinder utilizing improved fluid seals according to this invention;

FIGURE 2 is a central sectional view of the external slipper ring used as a piston seal;

FIGURE 3 is a central sectional view of the internal slipper ring used as a piston rod seal;

FIGURE 4 is a central sectional view of a conventional, standard O-ring;

FIGURE 5 is a fragmentary, enlarged view of a radially outer end of the internal slipper ring of FIGURE 3;

FIGURE 6 is a fragmentary, enlarged view of a radially outer end of the external slipper ring of FIGURE 2;

FIGURE 7 is a fragmentary, enlarged view of a radially outer end of the standard O-ring of FIGURE 4;

FIGURE 8 is a fragmentary sectional view of one end of the piston seal shown in FIGURE 1 installed in its groove and illustrating the appearance of the external slipper and its associated O-ring loading element before assembly of the piston in its mating cylinder;

Figure 9:
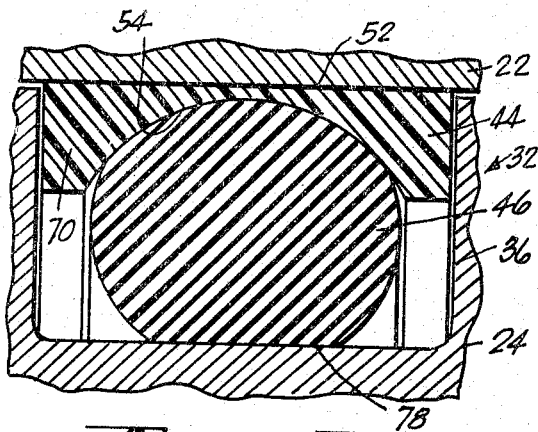
FIGURE 9 is a fragmentary sectional view of the end of the piston seal shown in FIGURE 8 illustrating the compressed appearance of the seal after assembly of the piston in its mating cylinder.
Figure 10:
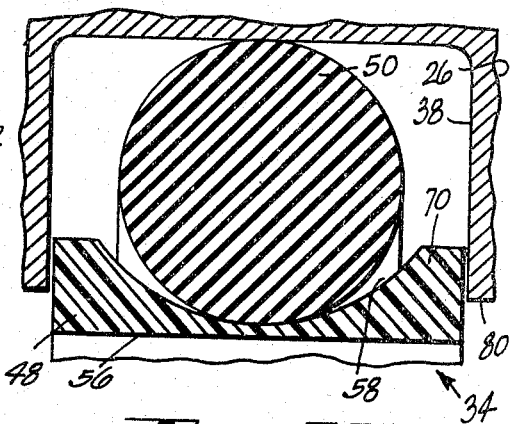
FIGURE 10 is a fragmentary sectional view of one end of the piston rod seal installed in its groove, and illustrating the appearance of the internal slipper and its associated O-ring loading member prior to assembly of the piston rod in the bearing gland.
Figure 11:
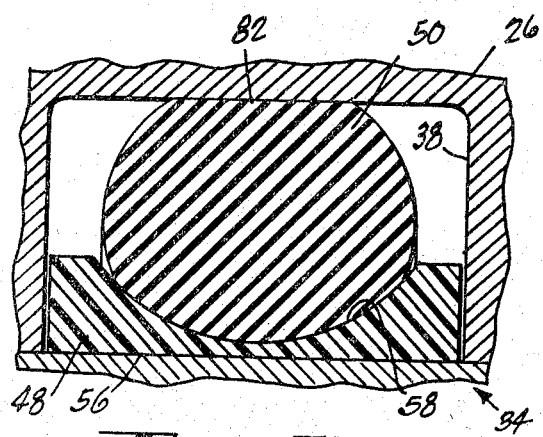
Figure 12:
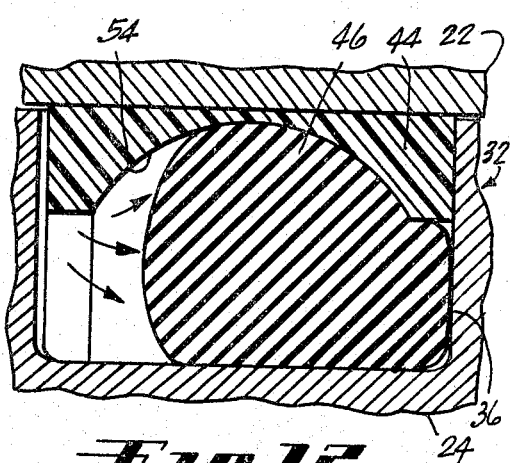

FIGURE 11 is a fragmentary sectional view of the end of the piston rod seal shown in FIGURE 10, illustrating the compressed appearance of the seal after assembly of the piston rod in the bearing gland; and FIGURE 12 is a fragmentary sectional view similar to that of FIGURE 9 with fluid pressure acting on the seal, and illustrating the movement and distortion of the O-ring loading element due to such fluid pressure.

FIGURE 1 is a fragmentary sectional view of two relatively slidable members including the piston and cylinder of a hydraulic actuator, for example, shown in a central and longitudinal sectional view. The cylinder assembly 20 generally includes a cylinder member 22, a piston member 24 and a piston rod bushing gland 26 which is held in position against a shoulder 28 in the cylinder member 22 by a nut 30. As is well-known, hydraulic fluid is utilized in the cylinder member 22 to effect the powered reciprocation of piston member 24 by reversal in direction of hydraulic fluid pressure within the cylinder member 22 on opposite sides of the piston member 24.

Improved fluid seals 32 and 34 according to this invention are illustratively provided in the usual annular, generally rectangular cross sectional grooves 36 and 38 in the respective peripheral surfaces of the piston member 24 and the piston rod bushing gland 26 as shown. The bushing gland 26 also has another annular, generally rectangular groove 40 which carries a conventional O-ring packing member 42. When the relatively movable members 22 and 24 reciprocate, the seals 32 and 34 must provide dynamic sealing at working pressure.

The two seals 32 and 34 in their respective grooves 36 and 38 are essentially identical except, of course, for a reversal of parts, and in the radial direction of sealing pressure for each of the two seals. The seal 32 in groove 36 includes an external slipper ring 44 located at the radially outer end of the groove 36, and a conventional, annular O-ring loading element 46 located within the groove 36 between the radially inner, concave face of the slipper ring 44 and the base of the groove 36. Similarly, the seal 34 in groove 38 includes an internal slipper ring 48 located at the radially inner end of the groove 38, and a conventional, annular O-ring loading element 50 located within the groove 38 between the radially outer, concave face of the slipper ring 48 and the base of the groove 38.

The slipper ring 44 can be conveniently referred to as the external slipper 44 because it provides an external, cylindric slipper surface for the piston member 24. Similarly, the slipper ring 48 can be conveniently referred to as the internal slipper 48 because it provides an internal, cylindrical slipper surface for the piston rod tubular bushing gland 26. The seals 32 and 34 can, of course, be used for applications other than one in which the relatively movable members are arranged for reciprocatory motion. For example, seals similar to the seals 32 and 34 can be used to provide equally effective seals between two relatively rotating members as with two relatively reciprocating members wherein only linear motion is involved. Such seals can also be used for static applications, if desired.

The external and internal slippers 44 and 48 are fabricated from a material having a low coefficient of friction, such as Teflon, and the conventional O-rings 42, 46 and 50 are made of a resilient and deformable material such as rubber, which may be either natural or synthetic as the particular use or application may warrant or necessitate. The seals 32 and 34 may be used in their respective grooves 36 and 38 as indicated in FIGURE 1. The slippers 44 and 48 have widths or axial lengths which are slightly less than the widths or axial lengths of their respective grooves 36 and 38.

FIGURE 2 is a central sectional view of the external slipper ring 44. The slipper ring 44 is symmetrical as shown, and is normally a circular ring having a cylindric-radially outer surface 52 and a circularly concave, radially inner surface 54. The cylindric outer surface 52 of the external slipper ring 44 has a diameter D (ext.) which is, of course, related to the bore diameter in its mating cylinder. The slipper ring 44 also has a maximum inner diameter D (E.O.D.) as indicated in FIGURE 2.

FIGURE 3 is a central sectional view of the internal slipper ring 48. The slipper ring 48 is also symmetrical as shown, and is normally a circular ring having a cylindric, radially inner surface 56 and a circularly concave, radially outer surface 58. The internal slipper ring 48 has a minimum outer diameter D (I.I.D.) and the cylindric sealing surface 56 of the slipper ring 48 has a diameter D (int.) as indicated in FIGURE 3 which is, of course, related to the diameter of its mating rod.

FIGURE 4 is a central sectional view of a conventional and standard O-ring 60 which can be used as the loading element 46 in the seal 32 or as the loading element 50 in the seal 34. The standard O-ring 60 shown in FIGURE 4 has an inner diameter D (I.D.) and an outer diameter D (O.D.). Since standard O-rings are manufactured only in certain sizes that normally differ by a fixed increment between consecutive sizes, the inner and outer diameters D (I.D.) and D (O.D.) are selected to fit a rod or cylinder bore as closely as obtainable. Commercially available, standard O-rings in accordance with military specification MIL-P-5514 and MS 28775, for example, can be used in this invention.

FIGURE 5 is a fragmentary, enlarged view of a radially outer end of the internal slipper ring 48 shown in FIGURE 3. The slipper ring 48 has a cylindric, inner surface 56 of width W (int.) and sides 62 of radial length T (int.) as indicated. The concave outer surface 58 is a circular surface having a radius R (int.) which has its fixed end located on the line passing through the center of the dimension W (int.) perpendicularly thereto. The minimum radial distance between the concave outer surface 58 and the inner surface 56, and which is also perpendicular to the dimension W (int.) is indicated as dimension N (int.).

Cylindric, radially outer end surfaces 64 which are parallel to the inner surface 56 are formed at the maximum, radially outer ends of the internal slipper 48. Each of these end surfaces 64 has a width or axial length B (int.) and each makes an angle A (int.) with a line tangent to the concave surface 58 at the point of intersection with an end surface 64. In this invention, the width or axial length B (int.) is relatively short compared to the width or axial length W (int.) and the angles A (int.) are quite obtuse. Thus, relatively short, radial flanges 66 are produced at each axial end of the internal slipper 48.

FIGURE 6 is a fragmentary, enlarged view of a radially outer end of the external slipper ring 44 shown in FIGURE 2. This view is similar to the view shown in FIGURE 5 for the internal slipper ring 48, and dimensions W (ext.), T (ext.), R (ext.), N (ext.), B (ext.) and A (ext.) correspond to the respective dimensions W (int.), T (int.), R (int.), N (int.), B (int.) and A (int.) indicated in FIGURE 5. All of these dimensions for both the external and internal slipper rings 44 and 48 are preferably related in certain proportional relationships involving a single, reference dimension of the associated loading element used, or the standard mating O-ring 60 in this illustrative instance.

Cylindric, radially inner end surfaces 68 of the external slipper ring 44 shown in FIGURE 6 are similar to and correspond with the cylindric, radially outer end surfaces 64 of the internal slipper ring 48 shown in FIGURE 5. It can be seen that relatively short, radial flanges 70 are produced at each axial end of the external slipper 44. These flanges 70, however, extend radially in an opposite direction to the corresponding flanges 66 of the slipper 48.

FIGURE 7 is a fragmentary, enlarged view of a radially outer end of the standard O-ring 60 shown in FIGURE 4. The O-ring 60 has a circular cross section of diameter D (ref.) which is the single reference dimension that is preferably used in establishing various maximum and minimum values of the dimensions of the external and internal slipper rings 44 and 48. It is to be noted, of course, that if the characteristics of the materials used in fabricating the slipper rings 44 and 48, and the O-ring 60 (or loading elements 46 and 50), respectively, differ greatly from the usual Teflon and rubber utilized in aircraft hydraulic seals, for example, the empirically derived relationships may yield results which could be suitably modified somewhat to take into account such difference. However, the relationships are valid for extremely wide ranges of material characteristics since the relationships are based largely on geometrical considerations of structure rather than material.

Thus, optimumly assured installability and proper performance of seals according to this invention, certain relationships should be observed when using standard O-rings and standard grooves. In FIGURE 2, the maximum value of the free diameter D (ext.) of the external slipper 44 should be related to the nominal associated cylinder bore diameter by being, of course, equal to the maximum associated cylinder bore diameter. The proper O-ring loading element is selected from the standard sizes of O-rings for the particular cylinder bore diameter as given by the military specification MIL–P–5514, and this standard size O-ring can be used in a standard O-ring groove with the slipper 44 without giving excessive squeeze in this invention. This is accomplished by dimensionally relating the cross sectional shape of the external slipper 44 (and the internal slipper 48) to the cross sectional diameter of the selected standard O-ring, which is the reference dimension mentioned above.

In FIGURE 3, the minimum value of the free diameter D (i.i.d.) of the internal slipper 48 is related, in this invention, to the nominal associated rod diameter by being equal to the minimum rod diameter less the amount 0.35D (ref.), where D (ref.) is the cross sectional diameter of the selected standard O-ring for the particular size rod that is under consideration. This relationship will ensure easy installability of the internal slipper 48 with the standard O-ring in a standard groove to produce a properly formed seal. The cross sectional shape of the internal slipper 48 is, of course, dimensionally related to the diameter D (ref.) of the selected O-ring to provide a highly effective and reliable seal.

Similarly in FIGURE 5, the minimum value of the radius R (int.) of the internal slipper 48 is equal to 0.65D (ref.) and its minimum diameter is, of course, equal to 1.30D (ref.), the minimum value of the slipper width W (int.) is equal to 1.5D (ref.) and the minimum value of the flange 66 dimension T (int.) is equal to 0.4D (ref.). The maximum value of slipper thickness dimension N (int.) is equal to 0.15D (ref.) when the standard O-ring 60 shown in FIGURES 4 and 7 is used, for example, as the conventional O-ring loading element 50 of internal seal 34.

The values of corresponding dimensions of the external slipper 44 shown in FIGURE 6 are similar to those for the internal slipper 48. Thus, the minimum value of radius R (ext.) of the external slipper 44 is equal to 0.65D (ref.) and its minimum diameter is, of course, equal to 1.30D (ref.), the minimum value of the slipper width W (ext.) is equal to 1.5D (ref.), the minimum value of the flange 70 dimension is equal to 0.4D (ref.) and the maximum value of slipper thickness dimension N (ext.) is equal to 0.15D (ref.) when the standard O-ring 60 shown in FIGURES 4 and 7 is used, for example, as the conventional O-ring loading element 46 of external seal 32.

The foregoing relationships establish dimensions which define one extreme limit of the proper cross sectional shape of the external and internal slippers when used with standard O-rings. The other limit in each case is defined in practice from considerations of manufacturing tolerances obtainable, desired closeness of axial fit in a specific groove, installability, consideration of friction, endurance and operating temperatures.

A standard and practical series of a Teflon external slipper in accordance with this invention is illustrated in Table I. This series is for a standard size groove of, for example, one-backup groove width, as given by military specification MIL–P–5514, and the dimensional notations are as indicated in FIGURES 2 and 6.

The corresponding standard and practical series of a Teflon internal slipper in accordance with this invention is as given below. This series is also for a standard size groove of, for example, one-backup groove width, as given by military specification MIL–P–5514, and the dimensional notations are as indicated in FIGURES 3 and 5.

TABLE I

| Dash No. | D (ext.) ±.005 | W (ext.) ±.002 | R (ext.) ±.005 | T (ext.) ±.005 | N (ext.) ±.001 |
| --- | --- | --- | --- | --- | --- |
| 8 | .557 | | | | |
| 9 | .620 | | | | |
| 10 | .682 | | | | |
| 11 | .745 | .165 | .075 | .050 | .008 |
| 12 | .807 | | | | |
| 13 | .870 | | | | |
| 14 | .932 | | | | |
| 15 | .995 | | | | |
| 16 | 1.057 | | | | |
| 17 | 1.120 | | | | |
| 18 | 1.182 | | | | |
| 19 | 1.245 | | | | |
| 20 | 1.307 | | | | |
| 21 | 1.370 | .202 | .100 | .070 | .008 |
| 22 | 1.432 | | | | |
| 23 | 1.495 | | | | |
| 24 | 1.557 | | | | |
| 25 | 1.620 | | | | |
| 26 | 1.682 | | | | |
| 27 | 1.745 | | | | |
| 28 | 1.870 | | | | |
| 29 | 1.995 | | | | |
| 30 | 2.120 | | | | |
| 31 | 2.245 | | | | |
| 32 | 2.370 | | | | |
| 33 | 2.495 | | | | |
| 34 | 2.620 | | | | |
| 35 | 2.745 | | | | |
| 36 | 2.870 | | | | |
| 37 | 2.995 | | | | |
| 38 | 3.120 | | | | |
| 39 | 3.245 | .305 | .150 | .090 | .008 |
| 40 | 3.370 | | | | |
| 41 | 3.495 | | | | |
| 42 | 3.620 | | | | |
| 43 | 3.745 | | | | |
| 44 | 3.870 | | | | |
| 45 | 3.995 | | | | |
| 46 | 4.120 | | | | |
| 47 | 4.245 | | | | |
| 48 | 4.370 | | | | |
| 49 | 4.495 | | | | |
| 50 | 4.620 | | | | |
| 51 | 4.745 | | | | |
| 52 | 4.870 | | | | |

TABLE II

| Dash No. | D (int.) ±.005 | W (int.) ±.002 | R (int.) ±.005 | T (int.) ±.005 | N (int.) ±.001 |
| --- | --- | --- | --- | --- | --- |
| 8 | .330 | | | | |
| 9 | .392 | | | | |
| 10 | .455 | | | | |
| 11 | .517 | .165 | .075 | .050 | .008 |
| 12 | .580 | | | | |
| 13 | .642 | | | | |
| 14 | .705 | | | | |
| 15 | .695 | | | | |
| 16 | .757 | | | | |
| 17 | .820 | | | | |
| 18 | .882 | | | | |
| 19 | .945 | | | | |
| 20 | 1.007 | | | | |
| 21 | 1.070 | .202 | .100 | .070 | .008 |
| 22 | 1.132 | | | | |
| 23 | 1.195 | | | | |
| 24 | 1.257 | | | | |
| 25 | 1.320 | | | | |
| 26 | 1.382 | | | | |
| 27 | 1.445 | | | | |
| 28 | 1.430 | | | | |
| 29 | 1.555 | | | | |
| 30 | 1.680 | | | | |
| 31 | 1.805 | | | | |
| 32 | 1.930 | | | | |
| 33 | 2.055 | | | | |
| 34 | 2.180 | | | | |
| 35 | 2.305 | | | | |
| 36 | 2.430 | | | | |
| 37 | 2.555 | | | | |
| 38 | 2.680 | | | | |
| 39 | 2.805 | .305 | .150 | .090 | .008 |
| 40 | 2.930 | | | | |
| 41 | 3.055 | | | | |
| 42 | 3.180 | | | | |
| 43 | 3.305 | | | | |
| 44 | 3.430 | | | | |
| 45 | 3.555 | | | | |
| 46 | 3.680 | | | | |
| 47 | 3.805 | | | | |
| 48 | 3.930 | | | | |
| 49 | 4.055 | | | | |
| 50 | 4.180 | | | | |
| 51 | 4.305 | | | | |
| 52 | 4.430 | | | | |

These slipper rings are used in conjunction with, for example, standard Army-Navy (AN) size O-ring packing elements in standard grooves per military specification MIL–P–5514. The dash numbers shown in Tables I and II above correspond to dash numbers of AN 6227 packing elements which are used with MIL–H–5606 mineral oil. Thus, the slipper identified by dash number 30 is to be used with the AN 6227–30 packing element. These dash numbers are also used to identify the standard size packing elements used for other types of hydraulic fluids.

The value of the diameter D (int.) of the internal slipper ring 48 in FIGURE 3 is made undersize relative to the minimum diameter of its associated rod by just enough margin to permit it to be inserted into the bore of the piston rod bushing gland 26 (FIGURE 1) and centered over the O-ring loading element 50 while folded into a kidney shape, and then unfolded to reassume its original shape without encountering excessive opposition from the O-ring loading element 50, which also has an inner diameter less than the minimum diameter of the rod which is to be sealed.

The internal slipper ring 48 is then expanded by the rod, or a piloting mandrel or bullet if the rod itself has an insufficient entry chamfer provided thereon, to its final installed diameter thus squeezing the O-ring loading element 50 a proper amount. When the cross sectional shape of the slipper 48 is appropriately related to the reference dimension or cross sectional diameter of the loading element 50, suitably dimensioned slipper flanges 66 are provided which positively retain the slipper 48 in its groove against the dragging action of the rod or bullet when it is inserted in the bore of the piston rod bushing gland 26 to expand the slipper 48. At the same time, the circularly concave surface 58 in the cross sectional shape of the slipper 48 centrally aligns and evenly compresses the loading element 50 to permit easy and rapid formation of a properly installed seal 34.

FIGURE 8 is a fragmentary sectional view of the external seal 32 installed in groove 36 of the piston member 24. The external slipper 44 and its O-ring loading element 46, however, have not been assembled into the bore of cylinder member 22. The O-ring loading element 46 is first stretched over the end land 72 of the piston member 24 and permitted to contract into the groove 36. The external slipper 44 is then positioned over the loading element 46 by means of an expander device (not shown) which is a simple thin-wall tube that tapers down from a larger end thereof to a diameter equal to or less than the diameter of end surfaces 68.

The slipper 44 is slid over the smaller end of the expander and moved to the larger end. The inner diameter of the larger end of the tube is such that the tube can be concentrically slipped over the end of the piston member 24, with the larger end positioned over the groove 36. The slipper 44 is merely moved off the larger end of the expander and is thus located directly over the loading element 46. After removal of the expander, the slipper ring 44 is shrunk on the O-ring loading element 46 by means of a conventional ring clamp (not shown). The installed seal 32 then assumes the appearance as illustrated in FIGURE 8.

It can be readily seen from FIGURE 8 that the O-ring loading element 46 can be easily positioned in the groove 36, and its radially outer, rounded end 74 protrudes a little above the radially outer surface of the land 72. This rounded end 74 of the loading element 46 is in contact with the center of the circularly concave surface 54 of the slipper 44 which is substantially fixed in position axially by the sides of groove 36. The radius of the surface 54 can be seen to be larger than that of the loading element 46. As a consequence, the circularly concave surface 54 acts to center and radially align the loading element 46 during installation but does not solidly lock or engage the same during or after installation. It is to be noted that a slight central peak 76 is produced by the rounded end 74 at the axial center of the slipper 44.

FIGURE 9 is a fragmentary sectional view of seal 32 similar to that of FIGURE 8 showing the seal appearance after assembly into the bore of cylinder member 22. The central peak 76 indicated in FIGURE 8 greatly facilitates such assembly where an integral or closed groove is concerned. It is apparent that the peak 76 produces axial ramps on both sides of it, which in conjunction with conventional cylinder bore entry chamfers, permits the slipper 44 to compress the loading element 46 uniformly and properly as the piston member 24 is being inserted into the bore of the cylinder member 22. The flanges 70 in a correctly dimensioned slipper cross sectional configuration, will restrain angular tilting of the slipper 44 in an axial plane, and prevent the slipper 44 from leaving the groove 36 during the assembly process.

The squeezed or compressed loading element 46 acts as a spring in keeping the radially outer surface 52 of the slipper 44 firmly in contact with the bore surface of the cylinder member 22. It also effects a static seal between the slipper 44 and the base of the groove 36 as is evident from FIGURE 9. The squeezed loading element 46 can be seen to occupy a major portion of the circularly concave surface 54 of the slipper 44. At the same time, however, the radially inner end or portion 78 of the squeezed loading element 46 is firmly in contact with a substantial portion of the base of groove 36. The base of groove 36 in the ordinary standard groove has a much higher coefficient of friction with the loading element 46 than does the Teflon surface 54 and, by virtue of the established radius of the concave surface 54, the loading element 46 tends to move along the Teflon surface 54 with increasing fluid pressure, wherein the flattened portion 78 remains comparatively more fixed and acts as a broad, instantaneous center of rotation for the squeezed loading element 46. Very little scrubbing occurs at portion 78 of the loading element 46.

FIGURE 10 is a fragmentary sectional view of the internal seal 34 illustrating the seal installed in the groove 38 of the piston rod bearing gland 26 before assembly with the rod of piston member 24. This view corresponds to that of FIGURE 8. It can be seen that the radially inner diameter of the slipper 48 would be smaller than the diameter of the piston rod which has a diameter only slightly less than that of the gland bore surface 80, since the cylindric sealing surface 56 of the slipper 48 is significantly farther in radially as shown in FIGURE 10.

The circularly concave surface 58 of the internal slipper 48 acts to maintain the loading element 50 axially in central alignment both during installation and squeezing thereof, as in the installation and assembly of the external seal 32. The slipper flanges 70 are of proper dimensions in this invention to retain the slipper 48 positively in the groove 38 as the expansion of the slipper 48 and compression of loading element 50 is being accomplished during entry of either the normally chamfered piston rod end or a piloting mandrel or bullet (as required) in the assembly process.

FIGURE 11 is a a fragmentary sectional view similar to that of FIGURE 9, showing the appearance of the seal 34 after the rod of the piston member 24 has been properly assembled into piston rod gland 26. As was discussed in respect to the external seal 32 of FIGURE 9, the loading element 50 is in contact with a major portion of the circularly concave surface 58 of the slipper 48 but is also in contact with a substantial portion 82 of the base of groove 38 with which it has a higher coefficient of friction than with the concave Teflon surface 58 of slipper 48. With the dimensioning of the cross sectional shape of the slipper 48 as provided by this invention, movement of the loading element 50 under increasing fluid pressure will be largely along the Teflon concave surface 58 which is a smooth and fully curved surface. The net result is that very little scrubbing occurs at the portion 82 of the loading element 50, and a long life and effective seal is obtained.

FIGURE 12 is a fragmentary sectional view of external seal 32, similar to that of FIGURE 9 wherein fluid pressure is active on the seal 32. The effect on the loading element 46 is to distort its shape and cause it to move mainly along the circularly concave surface 54 to the right as illustrated. The greater is the fluid pressure, the greater will the loading element 46 be distorted and moved against the wall of the groove 36. The loading element 46 will, of course, transmit the increased pressure through distortion to the slipper 44 such that increased sealing force will be produced in a radial direction against the surface of the cylinder member 22.

A reversal of pressure will cause the loading element 46 to move largely along the concave Teflon surface 54 in the other direction. Very little scrubbing occurs at the base of the groove 36, and the curvature of the concave surface 54 is such as to tend to re-align the loading element 36 centrally as it is moved back and forth by changes of fluid pressure. A similar action takes place with the internal seal 34 for changes in working fluid pressure, of course.

The cross sectional shape or configuration of the slippers and the dimensional proportioning relative to that of the mating O-ring loading element constitutes an important novel feature of this invention. In both external and internal slippers of this invention, the dimensioning is such that installation and assembly is greatly facilitated, and prevention of damage or improper installation of a seal is assured. In the internal slipper of this invention, the as-machined size of its inner diameter D (I.I.D.) which is that size prior to expanding during installation, is made undersize relative to the diameter of the rod it contacts whereas other types of internal slippers or cap rings of other inventions have an as-machined inner diameter which is quite near to, or sometimes even slightly larger than, the rod diameter.

The invention is illustratively characterized in one aspect which indicates a vastly superior seal by the fact that for seals under approximately two inches in diameter, it is possible to install the improved hydraulic seal without splitting the groove therefor whereas a split installation is required for the existing types of seals now in use. Another illustrative fact characterizing the effectiveness and reliability of the invention is that standard O-rings in standard grooves can be used without requiring a special series of sizes therefor.

While only two specific embodiments of this invention have been described above and shown in the drawings, it is to be understood that the particular embodiments of this invention are merely illustrative of, and not restrictive on the broad invention, and that various changes in design, structure and arrangement may be made without departing from the spirit and scope of the appended claims.

We claim:
1. An improved fluid seal comprising:
an annular slipper having a cross sectional configuration which is symmetrical about an axially central radius, said cross sectional configuration including
an axially extending sealing contour portion disposed symmetrically to said central radius and adapted to contact an associated mating contour portion of the cross sectional configuration of another structure, and
a fully curved, guiding contour portion disposed symmetrically in its relaxed state to said central radius; and
an annular loading element having a cross sectional configuration including
a contacting contour portion adapted to contact at least a part of said fully curved contour portion of the cross sectional configuration of said slipper, said fully curved contour portion acting to center and radially align said contacting contour portion symmetrically about said central radius for even compression of said contacting contour portion during installation of said fluid seal and thereafter whereby said fluid seal can be properly and easily installed in conventional closed, unsplit grooves of very relatively small to very relatively large sizes.

2. Apparatus as defined in claim 1 wherein said fully curved, guiding contour portion of the cross sectional configuration of said slipper is a concave portion of a first conic section curve and said contacting contour portion of the cross sectional configuration of said loading element is a convex portion of a second, similar, conic section curve.

3. An improved fluid seal for precluding leakage of fluid past two relatively movable members having mating cylindric surfaces, one of said surfaces having an annular groove of substantially rectangular cross section confronting the other surface, said seal being installed in said groove and comprising:
an annular slipper fabricated of a relatively hard-to-deform material with a low coefficient of friction in the shape of a flexible ring having a cross sectional configuration which is symmetrical about an axially central radius, said cross sectional configuration including
an axially extending, sealing contour portion disposed symmetrically to said central radius and adapted to contact an associating mating contour portion of the cross sectional configuration of another structure, and
a fully curved, guiding contour portion of a concave conic section curve disposed symmetrically in its relaxed state to said central radius; and
an annular loading element fabricated of a resilient and easily deformable material in the shape of another flexible ring having a cross sectional configuration dimensionally related to the cross sectional configuration of said loading element and including
a contacting contour portion of a convex conic section curve similar to the concave conic section curve and adapted to contact at least a part of said guiding contour portion of the concave conic section curve of the cross sectional configuration of said slipper, said fully curved contour portion acting to center and radially align said contacting contour portion symmetrically about said central radius for even compression of said contacting contour portion during installation of said fluid seal and thereafter whereby said fluid seal can be properly and easily installed in conventional closed, unsplit grooves of very relatively small to very relatively large sizes, and said loading element after installation in said groove tends to roll and slide along said fully curved contour portion while working under fluid pressure to minimize scrubbing of said loading element against a higher frictional base surface of said groove.

4. In a two-element fluid seal including an annular slipper and a cooperating annular loading element, an improved slipper comprising:
a continuous, flexible, annular ring having a cross sectional configuration which is symmetrical about an axially central radius, said cross sectional configuration including
an axially extending sealing linear contour portion disposed symmetrically to said central radius and adapted to contact an associated mating, linear contour portion of the cross sectional configuration of another structure, and
a fully curved, concave contour portion adapted to contact a convex part of the contour of the cross sectional configuration of the annular loading element, said fully curved, concave contour portion being disposed symmetrically in its relaxed state to said central radius and curved to cooperate with the convex part of the contour of the cross sectional configuration of the loading element in aligning said convex part with said concave contour portion symmetrically about said central radius for even compression of the annular loading element during and following installation of said fluid seal in a conventional closed groove.

5. The combination with cylinder and piston members, one of which is provided with a conventional closed, unsplit annular groove, of an improved fluid seal installed in said groove and comprising:

an annular slipper fabricated of a relatively hard-to-deform material with a low coefficient of friction in the shape of a flexible ring having a cross sectional configuration which is symmetrical about an axially central radius, said cross sectional configuration including an axially extending, sealing contour portion disposed symmetrically to said central radius and adapted to contact an associated mating contour portion of the member without said groove, and a fully curved, guiding contour portion disposed symmetrically to said central radius, said guiding contour portion in its relaxed state being a concave portion of a first circle; and an annular loading element fabricated of a resilient and easily deformable material in the shape of another flexible ring having a cross sectional configuration including a contacting contour portion adapted to contact at least a part of said guiding contour portion of said slipper, said contacting contour portion in its relaxed state being a convex portion of a second circle having a reference diameter, the diameter of said first circle being greater than said reference diameter by a fractional part thereof, said guiding contour portion acting to center and radially align said contacting contour portion symmetrically about said central radius for even compression of said loading element during installation of said fluid seal and thereafter, and said loading element after installation in said groove tends to roll and slide along said fully curved, guiding contour portion while working under fluid pressure to minimize scrubbing of said loading element against a higher frictional base surface of said groove, whereby said fluid seal can be easily and properly installed and operated in conventional closed, unsplit annular grooves of very relatively small to very relatively large sizes.

6. The combination with two relatively movable members having mating cylindric surfaces, one of said surfaces having a conventional closed, unsplit annular groove of substantially rectangular cross section confronting the other surface, of an improved fluid seal installed in said groove and comprising:

an annular slipper fabricated of a relatively hard-to-deform material with a low coefficient of friction in the shape of a flexible ring having a cross sectional configuration which is symmetrical about an axially central radius, said cross sectional configuration including an axially extending, flat sealing contour portion disposed symmetrically to said central radius and adapted to contact an associated mating contour portion of the cylindric surface without said groove, and a fully curved, guiding contour portion disposed symmetrically to said central radius, said guiding contour portion in its relaxed state being a concave portion of a first circle; and an annular loading element fabricated of a resilient and easily deformable material in the shape of another flexible ring having in its relaxed state a cross sectional configuration which is a second circle of a reference diameter that establishes the size of said groove, said second circle including a contacting convex contour portion adapted to contact at least a part of said guiding contour portion of said slipper, the diameter of said first circle being greater than said reference diameter by a fractional part thereof, said fully curved, guiding contour portion acting to center and radially align said contacting convex contour portion symmetrically about said central radius for even compression of said loading element during installation of said fluid seal and thereafter, and said loading element after installation in said groove tends to roll and slide along said fully curved, guiding contour portion while working under fluid pressure to minimize scrubbing of said loading element against a higher frictional base surface of said groove, whereby said fluid seal can be easily and properly installed and operated in conventional closed, unsplit grooves of very relatively small to very relatively large sizes.

7. In a two-element fluid seal, the combination with an annular O-ring pressure loading element having a relaxed cross sectional configuration which is a first circle of a reference diameter, of a slipper comprising:

a continuous, flexible, annular ring fabricated of a relatively hard-to-deform material with a low coefficient of friction and having a cross sectional configuration which is symmetrical about an axially central radius, said cross sectional configuration including a pressurally outer, axially extending, continuously flat, sealing contour portion disposed symmetrically to said central axis and adapted to contact an associated mating contour portion of the cross sectional configuration of another structure, side flanges extending radially from respective ends of said sealing contour portion at substantially angles thereto, and a pressurally inner, fully curved, guiding contour portion which is in its relaxed state a concave portion of a second circle and adapted to engage a contacting convex contour portion of the cross sectional configuration of said loading element, said guiding contour portion connecting ends of said side flanges together and disposed symmetrically to said central radius in its relaxed state, and cooperating with the contacting convex contour portion of said loading element cross sectional configuration to align the same symmetrically about said central radius for even compression of said loading element during and following installation of said fluid seal in a conventional closed annular groove, said guiding contour portion acting after installation to cause said loading element to roll and slide along said fully curved, guiding contour portion while working under fluid pressure to minimize scrubbing of said loading element against a higher frictional base surface of said groove.

8. An improved fluid seal for precluding leakage of fluid past two relatively movable members having mating cylindric surfaces, one of said surfaces having an annular groove of substantially rectangular cross section confronting the other surface, said seal being installed in said groove and comprising:

an annular slipper fabricated of a relatively hard-to deform material with a low coefficient of friction in the shape of a flexible ring having a cross sectional configuration which is symmetrical about an axially central radius, said cross sectional configuration including a pressurally outer, axially extending, flat sealing contour portion disposed symmetrically to said central radius and adapted to contact an associated mating flat portion of the cross sectional configuration of the cylindric surface without said groove, side portions extending radially from respective ends of said flat sealing contour portion, a pressurally, inner, fully curved, guiding contour portion which is in its relaxed state a concave portion of a first circle of a guiding diameter and disposed symmetrically to said central radius, and axially flat end portions connecting ends of said side portions to respective ends of said guiding contour portion; and an annular, pressure loading element fabricated of a resilient and easily deformable material in the shape of another ring having in its relaxed state a cross sectional configuration which is a second circle of a reference diameter, said second circle including a pressurally outer, contacting convex contour portion adapted to contact at least a part of said guiding contour portion of said slipper, said guiding diameter being greater than said reference diameter by a fractional part thereof, and said fully curved, guiding contour portion acting to center and radially align said contacting convex contour portion symmetrically about said central radius for even compression of said loading element during and following installation of said fluid seal, whereby said fluid seal can be easily and properly installed and operated in conventional closed, unsplit grooves of very relatively small to very relatively large sizes, and said loading element after installation in said groove tends to roll and slide along said fully curved, guiding contour portion while working under fluid pressure to minimize scrubbing of said loading element against a higher frictional base surface of said groove.

9. Apparatus as defined in claim 8 wherein the member having said groove therein is a rod of a predetermined diameter, said annular slipper is an internal slipper for use with said rod and having a minimum, radially outer, free ring diameter along said central axis equal to the diameter of said rod less an amount of the order of 0.35 times said reference diameter.

10. Apparatus as defined in claim 8 wherein said guiding diameter has a minimum value of the order of 1.3 times said reference diameter.

11. Apparatus as defined in claim 10 wherein the minimum radial distance between said guiding contour portion and said flat sealing contour portion has a maximum value of the order of 0.15 times said reference diameter, the axial length of said flat sealing contour portion has a minimum value of the order of 1.5 times said reference diameter, and the radial length of said side portions each has a minimum value of the order of 0.4 times said reference diameter.

12. In a two-element fluid seal including an annular slipper and a cooperating annular O-ring pressure loading element, an improved slipper comprising:

a continuous, flexible annular ring fabricated of a relatively hard-to-deform material with a low coefficient of friction and having a cross sectional configuration which is symmetrical about an axially central radius, said cross sectional configuration including a pressurally outer, axially extending, flat sealing contour portion disposed symmetrically to said central radius and adapted to contact an associated mating flat portion of the cross sectional configuration of another structure, side portions extending radially from respective ends of said flat sealing contour portion, a pressurally inner, fully curved, guiding contour portion which is in its relaxed state a concave portion of a circle of a predetermined diameter and disposed symmetrically in its relaxed state to said central radius, and axially flat end portions connecting ends of said side portions to respective ends of said guiding contour portion.

References Cited

UNITED STATES PATENTS

| Re. 24,440 | 3/1958 | Groen | 277—165 |
| 2,661,967 | 12/1953 | Mitchell | 277—165 |
| 2,877,070 | 3/1959 | Lee | 277—165 |
| 2,968,501 | 1/1961 | Tisch | 277—177 |
| 3,057,630 | 10/1962 | Sneed | 277—165 |
| 3,149,848 | 9/1964 | Galloway | 277—165 |
| 3,268,235 | 9/1966 | Jacobellis | 277—165 |

SAMUEL ROTHBERG, *Primary Examiner.*

PO-1050
(5/69)

UNITED STATES PATENT OFFICE
CERTIFICATE OF CORRECTION

Patent No. __3,328,041__  Dated __June 27, 1969__

Inventor(s) __John C. Bloom et al.__

It is certified that error appears in the above-identified patent and that said Letters Patent are hereby corrected as shown below:

Column 12, line 39, the term "loading element" should read --slipper--.

SIGNED AND
SEALED
APR 7 1970

(SEAL)
Attest:

Edward M. Fletcher, Jr.
Attesting Officer

WILLIAM E. SCHUYLER, JR.
Commissioner of Patents